United States Patent
Wang et al.

(10) Patent No.: US 12,060,534 B1
(45) Date of Patent: Aug. 13, 2024

(54) REACTION INTENSIFICATION STRUCTURE

(71) Applicant: ZHEJIANG UNIVERSITY, Hangzhou (CN)

(72) Inventors: Fei Wang, Hangzhou (CN); Wenhui Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/419,661

(22) Filed: Jan. 23, 2024

(30) Foreign Application Priority Data

May 10, 2023 (CN) .......................... 202310522286.9

(51) Int. Cl.
| | |
|---|---|
| *C10J 3/48* | (2006.01) |
| *B09B 3/40* | (2022.01) |
| *C10B 49/12* | (2006.01) |
| *C10J 3/72* | (2006.01) |

(52) U.S. Cl.
CPC .................. *C10J 3/72* (2013.01); *B09B 3/40* (2022.01); *C10B 49/12* (2013.01); *C10J 3/487* (2013.01); *C10J 2200/09* (2013.01); *C10J 2200/36* (2013.01); *C10J 2200/39* (2013.01); *C10J 2300/0946* (2013.01)

(58) Field of Classification Search
None
See application file for complete search history.

(56) References Cited

U.S. PATENT DOCUMENTS

| | | |
|---|---|---|
| 2011/0209977 A1 | 9/2011 | Rolland et al. |
| 2019/0062637 A1 | 2/2019 | Otterstrom |

FOREIGN PATENT DOCUMENTS

| | | | | |
|---|---|---|---|---|
| CA | 2682470 A1 | * 10/2008 | ............ | B01J 19/006 |
| CN | 110553249 A | 12/2019 | | |
| CN | 111174198 A | 5/2020 | | |
| CN | 110553249 B | * 12/2021 | ................ | C10J 3/20 |
| CN | 114836243 A | 8/2022 | | |
| EP | 687862 A1 | * 12/1995 | .............. | C10J 3/487 |
| JP | 2014111775 A | 6/2014 | | |

* cited by examiner

*Primary Examiner* — Jennifer A Leung (57) ABSTRACT

Provided is a reaction intensification structure. The structure includes a pyrolysis gasification apparatus, a flow strengthening mechanism and a turbulence mechanism. The pyrolysis gasification apparatus is cylindrical, and is provided with a feed inlet and a discharge outlet at front and rear ends thereof respectively. The flow strengthening mechanism is provided on an outer wall of the pyrolysis gasification apparatus at a position near the front end, and it is communicated with such apparatus and at an angle of 20° to 50° relative to a radial direction of such apparatus. The turbulence mechanism includes multiple turbulence bodies distributed in an array on an inner wall of the pyrolysis gasification apparatus and protrude towards a center of such apparatus. The turbulence bodies are divided into multiple groups distributed along an axial direction of such apparatus. Each group of turbulence bodies are distributed along a circumferential direction of such apparatus.

4 Claims, 7 Drawing Sheets

REACTION INTENSIFICATION STRUCTURE

TECHNICAL FIELD

The present disclosure relates to the technical field of pyrolysis gasification, and in particular to a reaction intensification (enhancement, reinforcement, strengthen) structure.

BACKGROUND

According to statistics, the annual output of urban organic solid waste in many countries is above 60 Mt, and it is increasing by about 10% every year. At present, the resource utilization efficiency of the organic solid waste in many countries is only 10%, and the common resource utilization method is pyrolysis gasification. Therefore, it is very important to effectively improve the utilization and disposal capacity of the organic solid waste and realize reduction and resource utilization of such solid waste. However, in a reaction process of the organic solid waste in the pyrolysis gasification apparatus, there are problems such as uneven mixing of material particles and insufficient contact between materials and air. Especially, the materials in a lower layer of the apparatus have less contact with high-temperature flue gas, high-temperature materials and air of an upper layer, which leads to incomplete and insufficient reaction in pyrolysis gasification of the materials in the apparatus, and affects the reaction efficiency of pyrolysis gasification.

SUMMARY

In order to solve at least one of the technical problems mentioned in the Background, the embodiments of the present disclosure provide a reaction intensification structure.

The reaction intensification structure provided in the embodiments of the present disclosure includes:
- a pyrolysis gasification apparatus, where the pyrolysis gasification apparatus is cylindrical, a front end of the pyrolysis gasification apparatus is provided with a feed inlet, and a rear end of the pyrolysis gasification apparatus is provided with a discharge outlet;
- a flow strengthening mechanism, where the flow strengthening mechanism is provided on an outer wall of the pyrolysis gasification apparatus at a position near the front end and is communicated with the pyrolysis gasification apparatus, and the flow strengthening mechanism is at an angle of 20° to 50° relative to a radial direction of the pyrolysis gasification apparatus; and
- a turbulence mechanism including a plurality of turbulence bodies, where the plurality of turbulence bodies are distributed in an array on an inner wall of the pyrolysis gasification apparatus and protrude towards a center of the pyrolysis gasification apparatus, the plurality of turbulence bodies are divided into a plurality of groups of turbulence bodies in an axial direction of the pyrolysis gasification apparatus, and each group of turbulence bodies is distributed along a circumferential direction of the pyrolysis gasification apparatus.

In the drawings: 1. pyrolysis gasification apparatus; 11. feed inlet; 12. discharge outlet; 2. flow strengthening mechanism; and 3. turbulence body.

DETAILED DESCRIPTION OF EMBODIMENTS

The technical schemes in the embodiments of the present disclosure will be clearly and comprehensively described in the following. Obviously, the described embodiments are only a part of the embodiments of the present disclosure, but not all the embodiments. Based on the embodiments of the present disclosure, for those skilled in the art, all other embodiments obtained without any creative effort fall within the scope of protection of the present disclosure.

The embodiments of the present disclosure provide a reaction intensification structure, by which the materials are fully mixed with each other and with the air, thereby intensifying the subsequent reaction process and improving the reaction efficiency of pyrolysis gasification. The reaction intensification structure includes a pyrolysis gasification apparatus, a flow strengthening mechanism and a turbulence mechanism. The pyrolysis gasification apparatus is cylindrical, a front end of the pyrolysis gasification apparatus is provided with a feed inlet, and a rear end of the pyrolysis gasification apparatus is provided with a discharge outlet. The flow strengthening mechanism is provided on an outer wall of the pyrolysis gasification apparatus at a position near the front end and is communicated with the pyrolysis gasification apparatus, and the flow strengthening mechanism is at an angle of 20° to 50° relative to a radial direction of the pyrolysis gasification apparatus. The turbulence mechanism includes a plurality of turbulence bodies, and the plurality of turbulence bodies are distributed in an array on an inner wall of the pyrolysis gasification apparatus and protrude towards a center of the pyrolysis gasification apparatus. The plurality of turbulence bodies are divided into a plurality of groups of turbulence bodies in an axial direction of the pyrolysis gasification apparatus, and each group of turbulence bodies is distributed along a circumferential direction of the pyrolysis gasification apparatus.

In some embodiments of the present disclosure, the flow strengthening mechanism is at an angle of 20°, 30°, 40° or 50° relative to the radial direction of the pyrolysis gasification apparatus.

In some embodiments of the present disclosure, a top surface of each of the turbulence bodies is a planar surface or a curved surface.

In some embodiments of the present disclosure, a curvature of the curved surface ranges from 0.526 to 2. In an implementation, the curvature of the curved surface is 1.111.

In some embodiments of the present disclosure, each group of turbulence bodies has four turbulence bodies.

In some embodiments of the present disclosure, 6 groups of turbulence bodies are distributed along the axial direction of the pyrolysis gasification apparatus.

In some embodiments of the present disclosure, a distance between a first group of turbulence bodies and the front end of the pyrolysis gasification apparatus is greater than 1 m.

In some embodiments of the present disclosure, a height of each of the turbulence bodies is 150 mm.

Compared with the prior art, the embodiments of the present disclosure bring about the beneficial effects as follows.

On one hand, in the embodiments of the present disclosure, the flow strengthening mechanism is provided on the outer wall of the pyrolysis gasification apparatus at a position near the front end, and it is communicated with the pyrolysis gasification apparatus, this is beneficial to strengthen the gas turbulence intensity in the pyrolysis gasification apparatus, thereby increasing the contact between the materials and air, and improving the reaction efficiency. On the other hand, the turbulence bodies are distributed in an array on the inner wall of the pyrolysis gasification apparatus and protrude towards the center of the pyrolysis gasification apparatus, this can not only stir the materials to enhance the mixing between the materials, but also strengthen the flow intensity of the gas in the reaction apparatus, thereby increasing the contact between the materials and air, and enhancing the mixing between the materials. As such, the reaction process is intensified, and the reaction efficiency is further improved.

Figure 1:
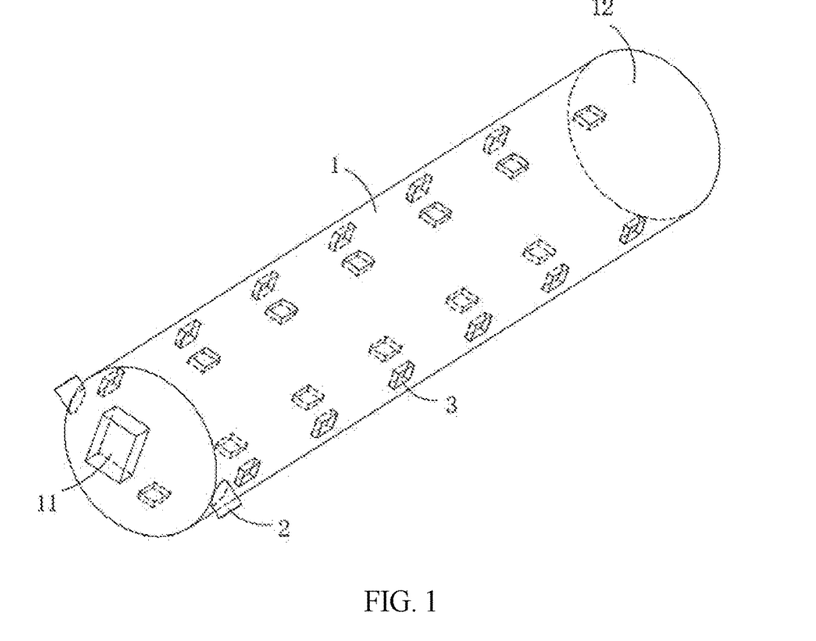
FIG. 1 is a schematic diagram of an overall structure of a reaction intensification structure according to the embodiments of the present disclosure.

Referring to FIG. 1, the embodiments of the present disclosure provide a reaction intensification structure, including a pyrolysis gasification apparatus 1 and a flow strengthening mechanism 2.

The pyrolysis gasification apparatus 1 is cylindrical. A front end of the pyrolysis gasification apparatus 1 is provided with a feed inlet 11, and a rear end of the pyrolysis gasification apparatus 1 is provided with a discharge outlet 12.

Figure 2:
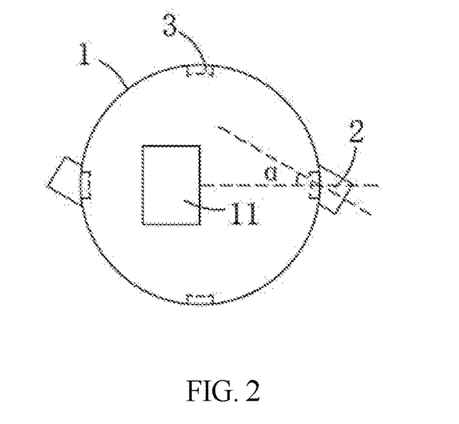
FIG. 2 is a schematic sectional view of the reaction intensification structure according to the embodiments of the present disclosure.

As illustrated from FIG. 2, the flow strengthening mechanism 2 is a tube, and it is configured to introduce air. The flow strengthening mechanism 2 is provided on an outer wall of the pyrolysis gasification apparatus at a position near the front end and it is communicated with the pyrolysis gasification apparatus. The flow strengthening mechanism is at an angle of $\angle\alpha$ relative to a radial direction of the pyrolysis gasification apparatus, where $\angle\alpha$ ranges from 20° to 50°.

Specifically, the flow strengthening mechanism is at an angle of 20°, 30°, 40° or 50° relative to the radial direction of the pyrolysis gasification apparatus.

Influences of different $\angle\alpha$ on a flow field and a material reaction rate in the pyrolysis gasification apparatus 1 are calculated through Ansys Fluent numerical simulation. The results of turbulence intensity distribution and material reaction rate in the pyrolysis gasification apparatus are illustrated respectively in FIG. 6 and FIG. 7.

Figure 6:
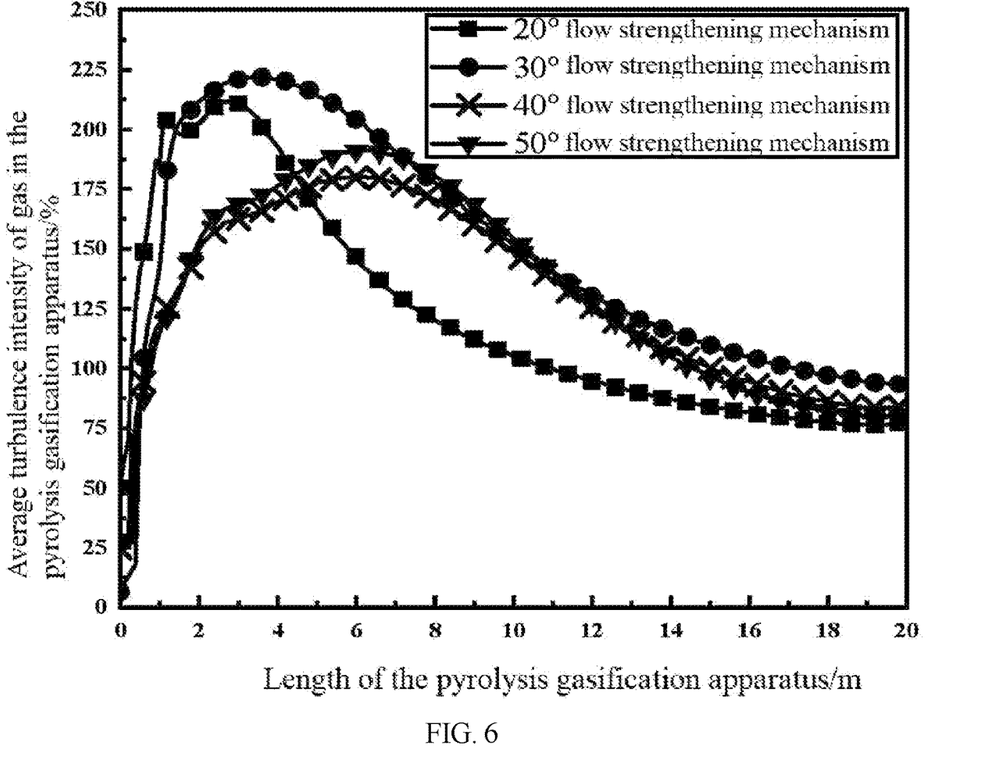
FIG. 6 is a schematic diagram illustrating average turbulence intensities of gas in the pyrolysis gasification apparatus at different angles of a flow strengthening mechanism relative to a radial direction of the pyrolysis gasification apparatus in the embodiments of the present disclosure.
Figure 7:
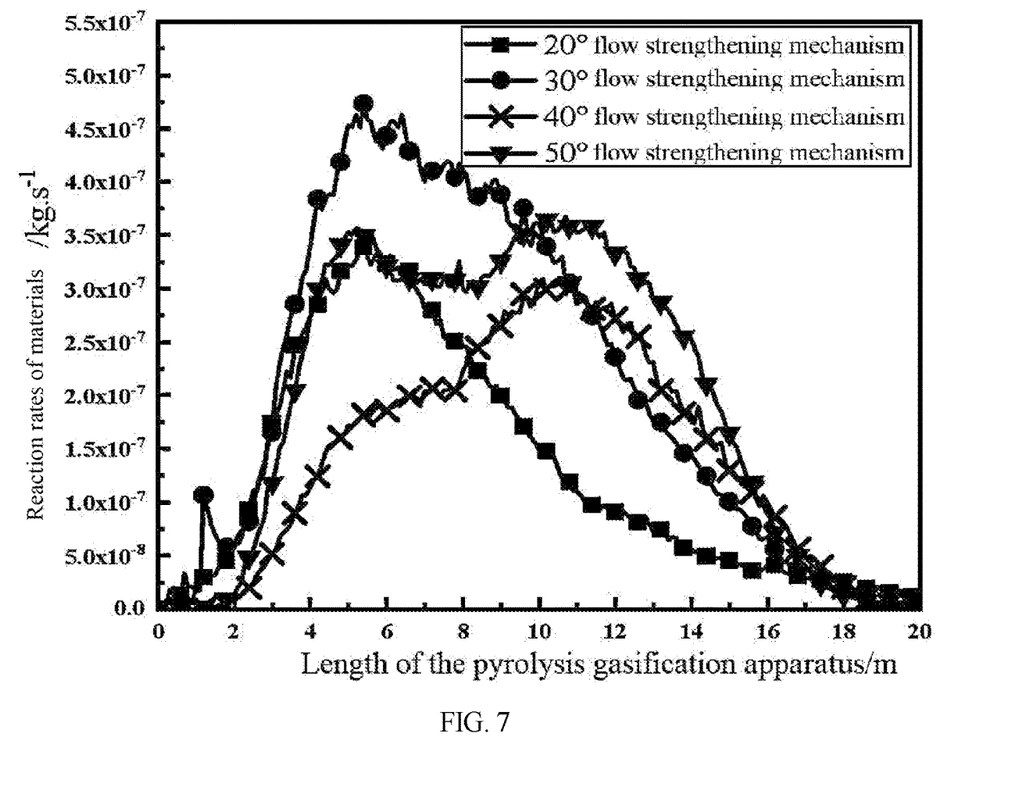
FIG. 7 is a schematic diagram illustrating reaction rates of materials in the pyrolysis gasification apparatus at different angles of the flow strengthening mechanism relative to the radial direction of the pyrolysis gasification apparatus in the embodiments of the present disclosure.

As can be seen from FIG. 6, when the flow strengthening mechanism is at an angle of 30° relative to the radial direction of the pyrolysis gasification apparatus, an average turbulence intensity of the gas in the pyrolysis gasification apparatus is the highest. The higher the turbulence intensity, the higher the mixing extent of materials and air, the higher the reaction efficiency, and the better the reaction effect of the materials. As can be seen from FIG. 7, when the flow strengthening mechanism is at an angle of 30° relative to the radial direction of the pyrolysis gasification apparatus, the reaction rate of the materials in the pyrolysis gasification apparatus is higher, the faster the materials react, which enables a complete reaction state to be reached quickly. Thus, the reaction efficiency of the materials can be improved.

Figure 3:
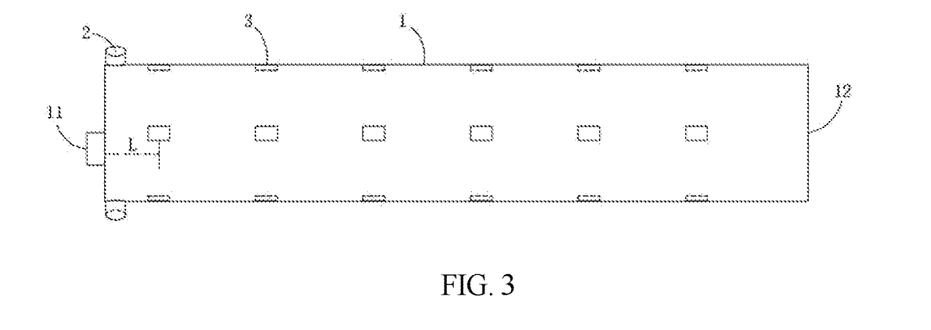
FIG. 3 is a schematic view illustrating axial arrangement of turbulence bodies of the reaction intensification structure according to the embodiments of the present disclosure.

In the embodiments, a turbulence mechanism is further included in the reaction intensification structure. The turbulence mechanism includes a plurality of turbulence bodies 3, and the plurality of turbulence bodies 3 are distributed in an array on an inner wall of the pyrolysis gasification apparatus and protrude towards the center of the pyrolysis gasification apparatus. As illustrated from FIG. 3, the plurality of turbulence bodies are divided into multiple groups of turbulence bodies along the axial direction of the pyrolysis gasification apparatus. As illustrated in FIG. 3, each group of turbulence bodies is distributed along a circumferential direction of the pyrolysis gasification apparatus.

Figure 4:
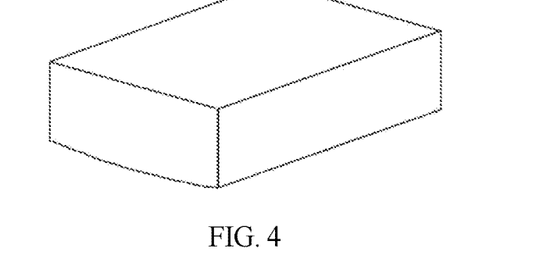
FIG. 4 is a schematic structure diagram of a turbulence body with a planar surface according to an embodiment of the present disclosure.
Figure 5:
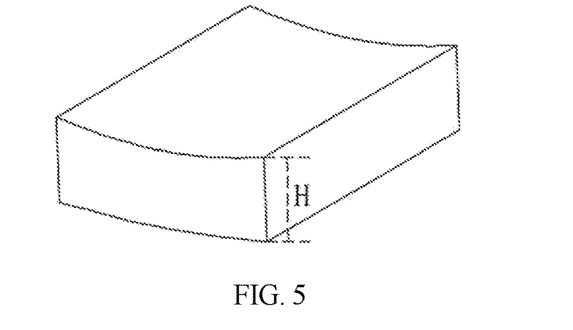
FIG. 5 is a schematic structural diagram of a turbulence body with a curved surface according to an embodiment of the present disclosure.

As illustrated in FIG. 4, a top surface of the turbulence body 3 is a planar surface. Alternatively, as illustrated in FIG. 5, the top surface of the turbulence body 3 is a curved surface. Each of the turbulence bodies is columnar, and a top surface of each turbulence body is parallel to a direction of an incoming flow of materials. When the turbulence body is designed to have a curved surface, an area of the top surface of the turbulence body is increased. The area of the curved top surface of the turbulence body (taking the curvature of 1.111 as an example) is 0.2418 m$^2$, and the area of the planar top surface of the turbulence body is 0.24 m$^2$. The area of one turbulence body having a curved top surface is increased by 0.583%; as such, the contact area and radiation area with materials are increased, which enables the mixing extent between the materials to be increased and the reaction efficiency to be improved.

On this basis, the curvature of the curved surface also affects the mixing intensity of the materials, which involves the following situations:

The curvature of the top surface of the turbulence body is 0.526.

The curvature of the top surface of the turbulence body is 0.588.

The curvature of the top surface of the turbulence body is 0.667.

The curvature of the top surface of the turbulence body is 0.769.

The curvature of the top surface of the turbulence body is 0.909.

The curvature of the top surface of the turbulence body is 1.111.

The curvature of the top surface of the turbulence body is 1.429.

The curvature of the top surface of the turbulence body is 2.

Figure 8:
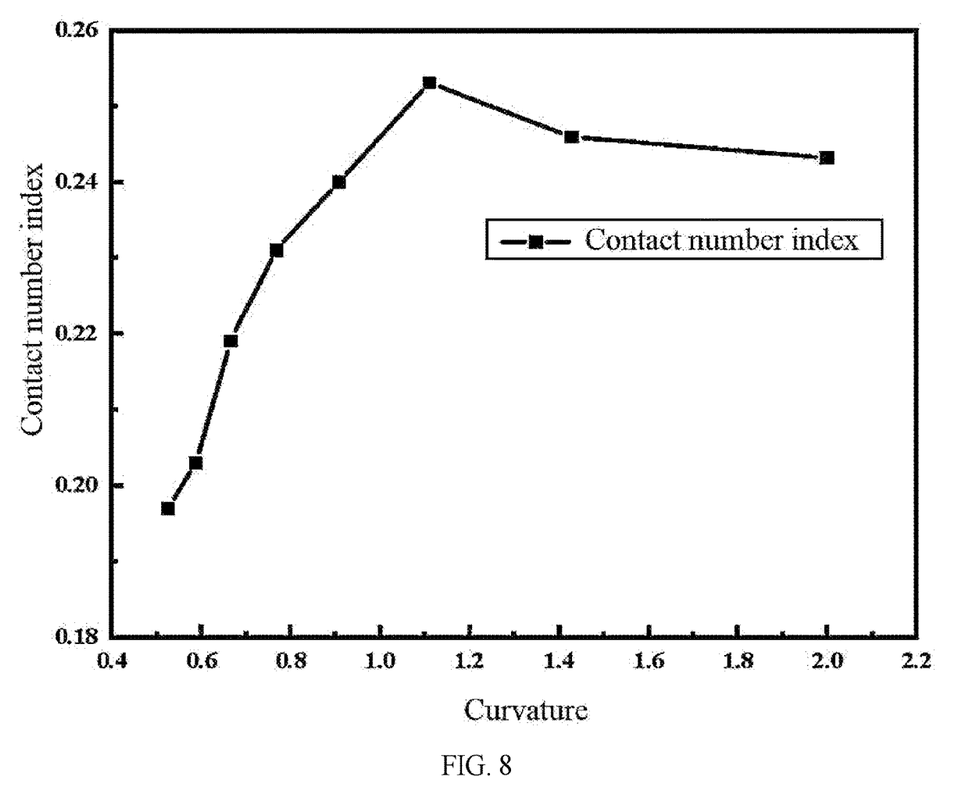
FIG. 8 is a schematic diagram illustrating a contact number index (an index indicating the number of contacts) under different curvatures of the turbulence body.

Through EDEM numerical simulation, different curvatures of the curved top surface of the turbulence bod are studied, and the optimum curvature of the curved top surface is obtained for the turbulence bodies, thus improving the mixing intensity of hazardous waste materials. The influence of different curvatures of the curved top surfaces of the turbulence bodies on the mixing process of materials is evaluated by a contact number index. The larger contact number index, the more fully the materials are mixed, that is, the structure of the turbulence body with this curvature is optimum. The influences of different curvatures of the turbulence body on the mixing of the materials are illustrated in FIG. 8. As can be seen from FIG. 8, when the curvature of the top surface of the turbulence body is 1.111, the contact number index is the largest, that is, the mixing extent between the materials is the highest under this structure, and the mixing intensity of the turbulence bodies to the materials is the largest.

On the other hand, in the embodiments, influences, on the mixing process of the materials, of the number of turbulence bodies in each group of turbulence bodies that are distributed along the circumferential direction of the pyrolysis gasification apparatus and the heights H of the turbulence bodies are also studied, which involves the following situations:

In each group, four turbulence bodies are distributed in the circumferential direction, and the height of each of the four turbulence bodies is 50 mm, 100 mm, 150 mm and 200 mm In each group, six turbulence bodies are distributed in the circumferential direction, the height of each of the turbulence bodies is 50 mm, 100 mm, 150 mm and 200 mm In each group, eight turbulence bodies are distributed in the circumferential direction, the height of each of the turbulence bodies is 50 mm, 100 mm, 150 mm and 200 mm.

Through the EDEM numerical simulation, the influences, on the mixing process of the materials, of different numbers of the turbulence bodies distributed in the circumferential direction and the heights of the turbulence body are studied, and the influences of such parameters of the turbulence bodies on the mixing process of the materials are evaluated by the contact number index. The greater the contact number index, the more fully the materials are mixed. The influences of the parameters of the turbulence bodies on the mixing process of the materials are illustrated in FIG. 9.

Figure 9:
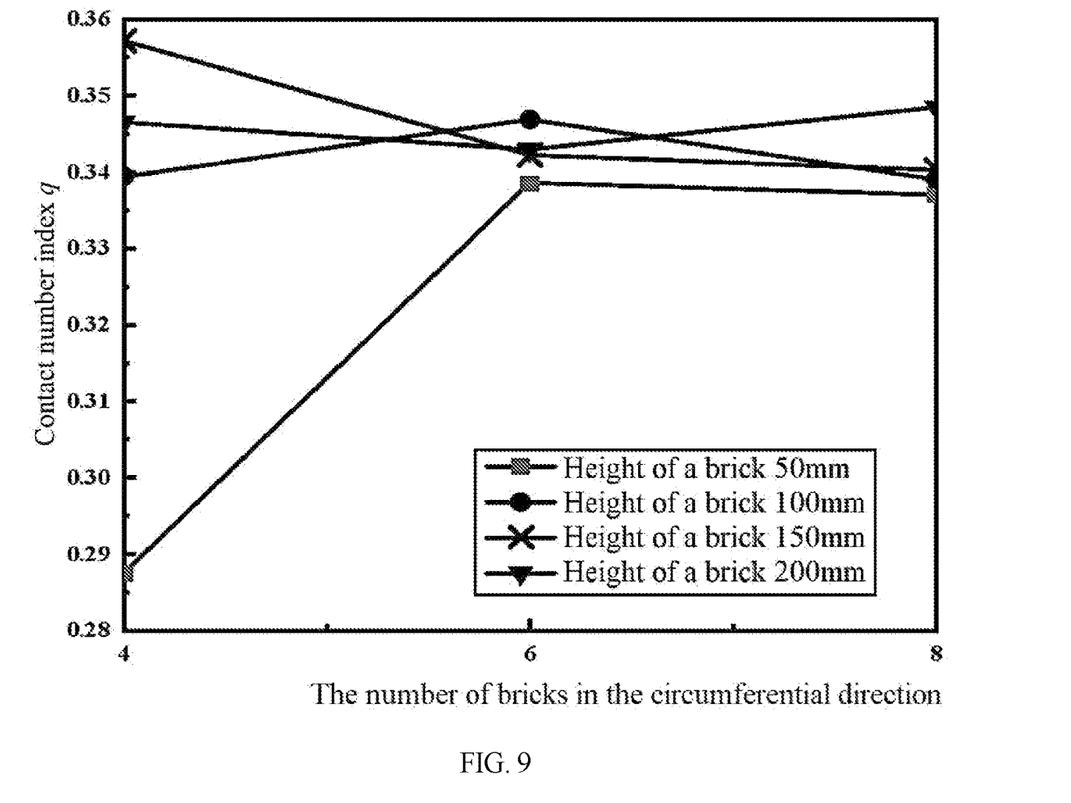
FIG. 9 is a schematic diagram illustrating the contact number index under different numbers of turbulence bodies in a circumferential direction and different heights of the turbulence body in the embodiments of the present disclosure.

As can be seen from FIG. 9, when the number of the turbulence bodies in the circumferential is four and the height of each turbulence body is 150 mm, the contact number index is the largest, that is, the mixing between the materials is the most sufficient under such structural parameters. When there is no turbulence body, the contact number index of the materials in the pyrolysis gasification apparatus is 0.244. After adding, in the circumferential direction, four turbulence bodies each having a height of 150 mm, the contact number index is increased to 0.357, which is increased by 46.3%. This greatly enhances the mixing extent of materials, and avoiding an incomplete reaction caused by material accumulation.

In the embodiments of the present disclosure, the influence of the number of the groups of turbulence bodies in the axial distribution, on the mixing process of materials is further studied, which involves the following situations:

Four groups of turbulence bodies are distributed in the axial direction.

Five groups of turbulence bodies are distributed in the axial direction.

Six groups of turbulence bodies are distributed in the axial direction.

Seven groups of turbulence bodies are distributed in the axial direction.

Eight groups of turbulence bodies are distributed in the axial direction.

Figure 10:
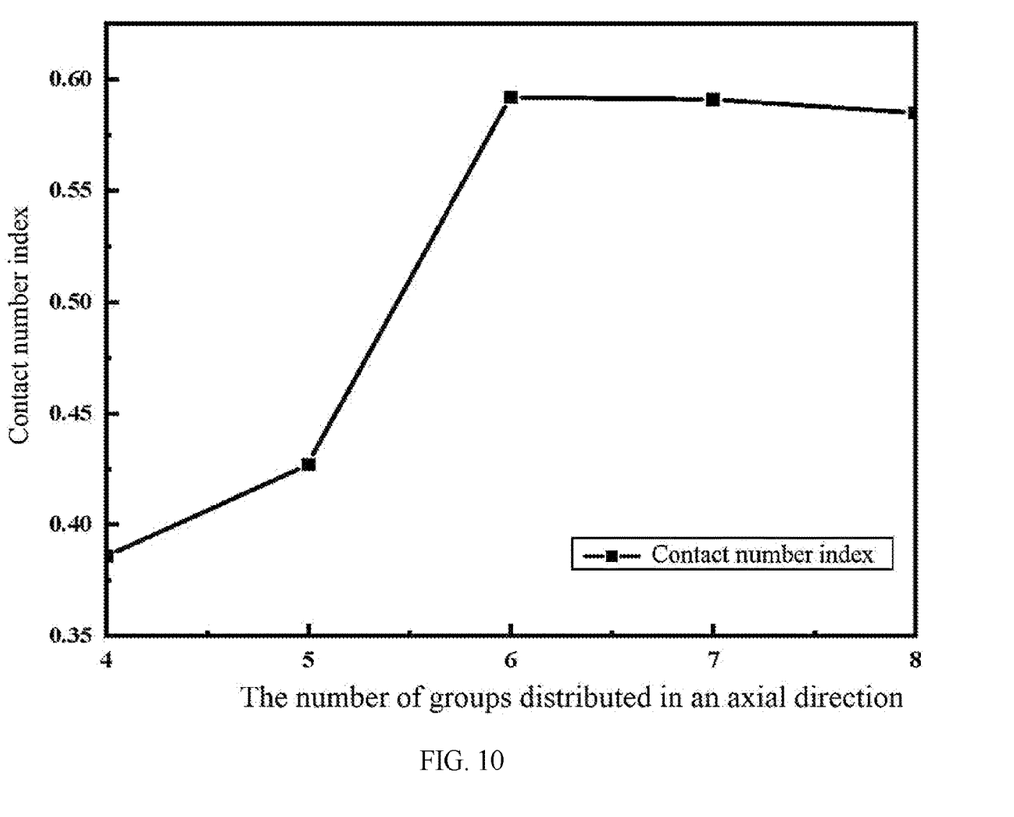
FIG. 10 is a schematic diagram illustrating the contact number index under different numbers of groups of turbulence bodies in an axial distribution in the embodiments of the present disclosure.

Through the EDEM numerical simulation, the influences of different numbers of the groups distributed in the axial direction, on the mixing process of materials are studied, and the influences of such parameters of the turbulence bodies on the mixing process of materials are evaluated by the contact number index. The greater the contact number index, the more fully the materials are mixed. The influences of such parameters of the turbulence bodies on the mixing process of materials are illustrated in FIG. 10.

By observing the contact number index under different numbers of the groups in the axial direction, it is found that the contact number index is the highest when six groups of turbulence bodies are distributed in the axial direction; and when there are more groups distributed in the axial direction, the movement of the materials is hindered, and some materials are not mixed, which decreases the contact number index. When there is no turbulence body, the contact number index of the materials in the pyrolysis gasification apparatus is 0.244; after adding six groups of turbulence bodies arranged in the axial direction, the contact number index is increased to 0.592, which is increased by 142.6%. This greatly enhances the mixing between materials and improves the mixing efficiency, and thus improves the reaction efficiency of materials.

In the embodiments of the present disclosure, the influence, on the mixing process of materials, of a distance L between a first group of turbulence bodies and the front end of the apparatus in the axial direction is further studied, which involves the following situations:

The distance from the first group of turbulence bodies to the front end of the apparatus is 0.4 m.

The distance from the first group of turbulence bodies to the front end of the apparatus is 0.6 m.

The distance from the first group of turbulence bodies to the front end of the apparatus is 0.8 m.

The distance from the first group of turbulence bodies to the front end of the apparatus is 1 m.

The distance from the first group of turbulence bodies to the front end of the apparatus is 1.2 m.

Figure 11:
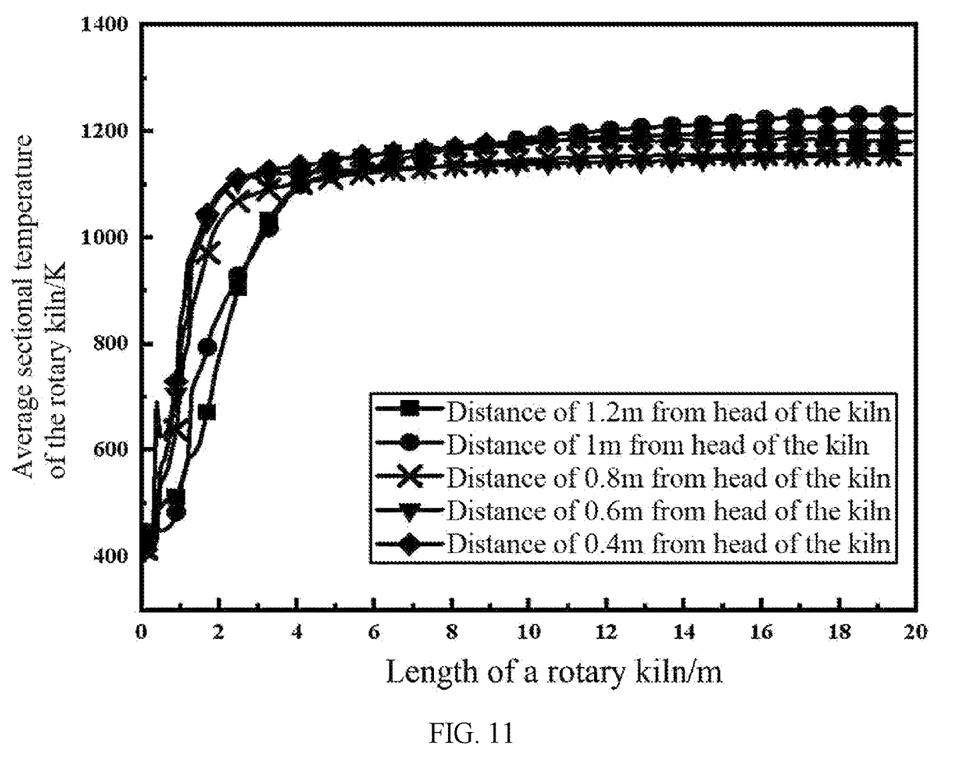
FIG. 11 is a schematic diagram of temperature distributions in the pyrolysis gasification apparatus at different distances from the front end of the apparatus in the embodiments of the present disclosure.

The first group of turbulence bodies is a group of turbulence bodies closest to the feed inlet. Through the Ansys Fluent numerical simulation, the influences, on the distribution of reaction temperature fields in the pyrolysis gasification apparatus, of different distances between the first group of turbulence bodies and the front end of the apparatus are calculated, and the temperatures in the pyrolysis gasification apparatus at five distances are illustrated in FIG. 11.

The position of the first group of turbulence bodies relative to the front end of the apparatus affects the temperature distribution at the front end of the pyrolysis gasification apparatus. As can be seen from FIG. 11, when the distance between the first group of turbulence bodies and the front end of the apparatus is less than 1 m, the temperature in the pyrolysis gasification apparatus rises rapidly within the first 2 m from the front end of the apparatus, which results in an excessively high heating rate. When the distance between the first group of turbulence bodies and the front end of the apparatus is greater than 1 m, the temperature in the pyrolysis gasification apparatus rises slowly, and the heating rate slows down, thus maintaining an operation stability of the pyrolysis gasification apparatus. When the first group of turbulence bodies is too close to the front end of the apparatus, some materials would be blocked by the turbulence bodies at the front end of the pyrolysis gasification apparatus, and an explosion would occur, which leads to excessive local temperature rise rate and high temperature at the front end of the apparatus, and endangers operation safety of the pyrolysis gasification apparatus. Therefore, the distance between the first group of turbulence bodies and the front end of the apparatus needs to be more than 1 m, so as to ensure the operation safety of the pyrolysis gasification apparatus and prevent the explosion from affecting the operation stability.

It is obvious to those skilled in the art that the present disclosure is not limited to the details of the embodiments mentioned above, and the present disclosure may be realized in other specific forms without departing from the spirit or basic characteristics of the embodiments of the present disclosure. Therefore, the embodiments shall be considered in all aspects as exemplary and not limiting, and the scope of the present disclosure is defined by the appended claims rather than the description above. The disclosure intends to embrace all changes that have the meaning and scope of equivalent elements of the claims.

What is claimed is:

1. A reaction intensification structure, comprising:
   a pyrolysis gasification apparatus, wherein the pyrolysis gasification apparatus is cylindrical, a front end of the pyrolysis gasification apparatus is provided with a feed inlet, and a rear end of the pyrolysis gasification apparatus is provided with a discharge outlet;
   a flow strengthening mechanism, wherein the flow strengthening mechanism is provided on an outer wall of the pyrolysis gasification apparatus at a position near the front end and is communicated with the pyrolysis gasification apparatus, and the flow strengthening mechanism is at an angle of 20° to 50° relative to a radial direction of the pyrolysis gasification apparatus;
   a turbulence mechanism comprising a plurality of turbulence bodies, wherein the plurality of turbulence bodies are distributed in an array on an inner wall of the pyrolysis gasification apparatus and protrude towards a center of the pyrolysis gasification apparatus, the plurality of turbulence bodies are divided into a plurality of groups in an axial direction of the pyrolysis gasification apparatus, and each group of turbulence bodies is distributed along a circumferential direction of the pyrolysis gasification apparatus;
   wherein each of the turbulence bodies is columnar, and a top surface of each turbulence body is parallel to a direction of an incoming flow of materials; the top surface of each turbulence body is a curved surface and a curvature of the curved surface ranges from 0.526 to 2; and each group of turbulence bodies has four turbulence bodies, and a height of each turbulence body is 150 mm.

2. The reaction intensification structure of claim 1, wherein the flow strengthening mechanism is at an angle of 20°, 30°, 40° or 50° relative to the radial direction of the pyrolysis gasification apparatus.

3. The reaction intensification structure of claim 1, wherein there are 6 groups of turbulence bodies along the axial direction of the pyrolysis gasification apparatus.

4. The reaction intensification structure of claim 1, wherein a distance between a first group of turbulence bodies and the front end of the pyrolysis gasification apparatus in the axial direction is greater than 1 m.

* * * * *